US009125119B2

(12) United States Patent
Jang et al.

(10) Patent No.: US 9,125,119 B2
(45) Date of Patent: Sep. 1, 2015

(54) TRANSITIONING OF A PACKET-SWITCHED EMERGENCY CALL BETWEEN FIRST AND SECOND TYPES OF WIRELESS ACCESS NETWORKS

(75) Inventors: Ke-Chi Jang, Plano, TX (US); Yi Song, Plano, TX (US); Jun Li, Richardson, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/145,751

(22) PCT Filed: Mar. 16, 2010

(86) PCT No.: PCT/US2010/027464
§ 371 (c)(1),
(2), (4) Date: Jul. 21, 2011

(87) PCT Pub. No.: WO2010/107782
PCT Pub. Date: Sep. 23, 2010

(65) Prior Publication Data
US 2011/0274012 A1    Nov. 10, 2011

Related U.S. Application Data

(60) Provisional application No. 61/160,545, filed on Mar. 16, 2009.

(51) Int. Cl.
*H04W 4/22* (2009.01)
*H04W 36/14* (2009.01)
(Continued)

(52) U.S. Cl.
CPC .............. *H04W 36/14* (2013.01); *H04W 4/22* (2013.01); *H04W 36/0066* (2013.01); *H04W 60/005* (2013.01); *H04W 76/007* (2013.01)

(58) Field of Classification Search
USPC .......................................... 370/259
See application file for complete search history.

(56) References Cited

U.S. PATENT DOCUMENTS 7,142,875 B2 * 11/2006 Kall et al. ............... 455/456.3
7,590,092 B2 *  9/2009 Milton et al. .............. 370/331
(Continued)

FOREIGN PATENT DOCUMENTS

CN          1941937        4/2007
CN        101291535       10/2008
(Continued)

OTHER PUBLICATIONS

International Search Report and Written Opinion dated Sep. 30, 2010 for International Application Serial No. PCT/US2010/027464, International Filing Date: Mar. 16, 2010 consisting of 8-pages.

(Continued)

*Primary Examiner* — Ian N Moore
*Assistant Examiner* — Lakeram Jangbahadur
(74) *Attorney, Agent, or Firm* — Dan Choi; Judy Yee; Micky Minhas

(57) ABSTRACT

A mobile station that is initially attached to a first type of wireless access network is involved in a packet-switched emergency call. Upon detection of transitioning of the mobile station, a message is sent indicating transitioning of the mobile station from the first type wireless access network to the second type wireless access network to cause the packet-switched emergency call to be performed over the second type wireless access network.

25 Claims, 6 Drawing Sheets

(51) Int. Cl.
*H04W 36/00* (2009.01)
*H04W 76/00* (2009.01)
*H04W 60/00* (2009.01)

(56) References Cited

U.S. PATENT DOCUMENTS

| | | | |
|---|---|---|---|
| 7,940,701 B2* | 5/2011 | Kikuchi | 370/259 |
| 8,036,175 B2* | 10/2011 | Suh et al. | 370/331 |
| 8,041,331 B2* | 10/2011 | Sokondar | 455/404.1 |
| 8,056,116 B2* | 11/2011 | Katoh et al. | 726/2 |
| 8,320,875 B2* | 11/2012 | Musgrove et al. | 455/404.1 |
| 8,428,601 B2* | 4/2013 | Samar et al. | 455/439 |
| 2007/0099664 A1 | 5/2007 | Hwang | |
| 2007/0149166 A1* | 6/2007 | Turcotte et al. | 455/404.1 |
| 2007/0254625 A1* | 11/2007 | Edge | 455/404.1 |
| 2007/0287459 A1* | 12/2007 | Diachina et al. | 455/436 |
| 2008/0008157 A1* | 1/2008 | Edge et al. | 370/351 |
| 2008/0102784 A1* | 5/2008 | Mittal et al. | 455/404.1 |
| 2009/0059865 A1* | 3/2009 | Zhang et al. | 370/331 |
| 2010/0118741 A1* | 5/2010 | Youn et al. | 370/259 |
| 2010/0226267 A1* | 9/2010 | Jang et al. | 370/252 |
| 2010/0304737 A1* | 12/2010 | Jain et al. | 455/426.1 |
| 2011/0007856 A1* | 1/2011 | Jang et al. | 375/356 |
| 2011/0026440 A1* | 2/2011 | Dunn et al. | 370/259 |
| 2011/0188411 A1* | 8/2011 | Faccin et al. | 370/259 |
| 2011/0261726 A1* | 10/2011 | Hakkinen et al. | 370/259 |
| 2012/0064934 A1* | 3/2012 | Jang et al. | 455/509 |

FOREIGN PATENT DOCUMENTS

| | | |
|---|---|---|
| JP | 200352070 | 9/2004 |
| JP | 2004363730 | 12/2004 |
| KR | 1019980051698 A1 | 9/1998 |
| RU | 2289890 | 12/2006 |
| RU | 2292670 | 1/2007 |
| WO | WO-2007127991 | 11/2007 |
| WO | WO-2008018937 | 2/2008 |
| WO | WO-2008100490 | 8/2008 |
| WO | WO-2008129436 | 10/2008 |
| WO | WO-2009026071 | 2/2009 |

OTHER PUBLICATIONS

"Foreign Office Action", Chinese Application No. 201080009284.0, (Aug. 5, 2013), 9 Pages.

"Foreign Office Action", JP Application No. 2012-500885, Dec. 3, 2013, 8 pages.

"Foreign Office Action", CN Application No. 201080009284.0, Nov. 14, 2014, 11 Pages.

"Foreign Office Action", RU Application No. 2011132491, Oct. 2, 2014, 5 Pages.

"3rd Generation Partnership Project; Technical Specification Group Services and System Aspects; IP Multimedia Subsystem (IMS) emergency sessions (Release 8)", 3GPP Standard; 3GPP TS 23.167, 3rd Generation Partnership Project (3GPP), Mobile Competence Centre ; 650, Route Des Lucioles ; F-06921 Sophia-Antipolis CEO; France, No. V8.2.0, pp. 1-36, Dec. 16, 2008.

"3rd Generation Partnership Project; Technical Specification Group Services and System Aspects; Architecture enhancements for non-3GPP access (Release 8)", 3GPP Standard; 3GPP TS 23.402, 3rd Generation Partnership Project (3GPP), Mobile Competence Centre ; 650, Route Des Lucioles ; F-06921 Sophia-Antipolis Cedex ; France, No. V8.4.1, Jan. 5, 2009, pp. 1-191.

"3rd Generation Partnership Project; Technical Specification Group Services and System Aspects; Support for IMS Emergency Calls over GPRS and EPS; (Release 9)", 3GPP Standard; 3GPP TR 23.869, 3rd Generation Partnership Project (3GPP), Mobile Competence Centre; 650, Route Des Lucioles; F-06921 Sophia-Antipolis Cedex; France, No. VO.7.0, Feb. 23, 2009, pp. 1-37.

"Extended European Search Report", EP Application No. 10753974.4, Jan. 22, 2015, 14 Pages.

"Identification of emergency call handover from E-UTRAN to HRPD", 3GPP Draft; S2-092197 Identification of Emergency Call Handover from EUTRAN to HRPD, 3rd Generation Partnership Project (3GPP). Mobile Competence Centre; 650 Route Des Lucioles; F-06921 Sophia-Antipolis Cedex; France, Mar. 24, 2009, 2 pages.

"Interoperability Specification (IOS) for Evolved High Rate Packet Data (eHRPD) Radio Access Network Interfaces and Interworking with Enhanced Universal Terrestrial Radio Access Network ( UTRAN) 3GPP2 Publication Version", 3GPP2 Draft; A.S0022-0. 3rd Generation Partnership Project 2, 3GPP2, 2500 Wilson Boulevard, Suite 300, Arlington, Virginia 22201 ; USA, vol. TSGA, No. v1.0, Mar. 11, 2009, pp. 1-192.

Et al.,' "Identification of emergency call handover from E-UTRAN to HRPD", 3GPP Draft; S2-092199 Identification of Emergency Call Handover from EUTRAN to HRPD to 23.402, 3rd Generation Partnership Project (3GPP). Mobile Competence Centre; 650 Route Des Lucioles; F-06921 Sophia-Antipolis Cedex; France, Mar. 24, 2009, 2 pages.

"Decision to Grant", JP Application No. 2012-500885, Jul. 15, 2014, 4 Pages.

"Foreign Office Action", CN Application No. 201080009284.0, Apr. 23, 2014, 9 Pages.

"Foreign Notice of Allowance", RU Application No. 2011132491, Apr. 16, 2015, 17 pages.

"Foreign Office Action", CN Application No. 201080009284.0, Jun. 3, 2015, 8 Pages.

\* cited by examiner

TRANSITIONING OF A PACKET-SWITCHED EMERGENCY CALL BETWEEN FIRST AND SECOND TYPES OF WIRELESS ACCESS NETWORKS

CROSS-REFERENCE TO RELATED APPLICATIONS

This application is a Submission Under 35 U.S.C. §371 for U.S. National Stage Patent Application of International Application Number: PCT/US2010/027464, filed Mar. 16, 2010 entitled "TRANSITIONING OF A PACKET-SWITCHED EMERGENCY CALL BETWEEN FIRST AND SECOND TYPES OF WIRELESS ACCESS NETWORKS," which claims priority to U.S. Provisional Application Ser. No. 61/160,545, filed Mar. 16, 2009, the entirety of both which are incorporated herein by reference.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2. CDMA 2000 defines one type of packet-switched wireless access network, referred to as the HRPD (High Rate Packet Data) wireless access network.

Another more recent standard that provides packet-switched wireless access networks is the Long Term Evolution (LTE) standard from 3GPP, which seeks to enhance the UMTS technology. The LTE standard is also referred to as the EUTRA (Evolved Universal Terrestrial Radio Access) standard.

SUMMARY

In general, according to an embodiment, a method comprises detecting that a mobile station is involved in a packet-switched emergency call, where the mobile station is initially attached to a first type of wireless access network. Upon detection of transitioning of the mobile station, a message is sent indicating transitioning of the mobile station from the first type wireless access network to the second type wireless access network to cause the packet-switched emergency call to be performed over the second type wireless access network.

Other or alternative features will become apparent from the following description, from the drawings, and from the claims.

BRIEF DESCRIPTION OF THE DRAWINGS

Some embodiments of the invention are described with respect to the following figures.

DETAILED DESCRIPTION

Figure 1:
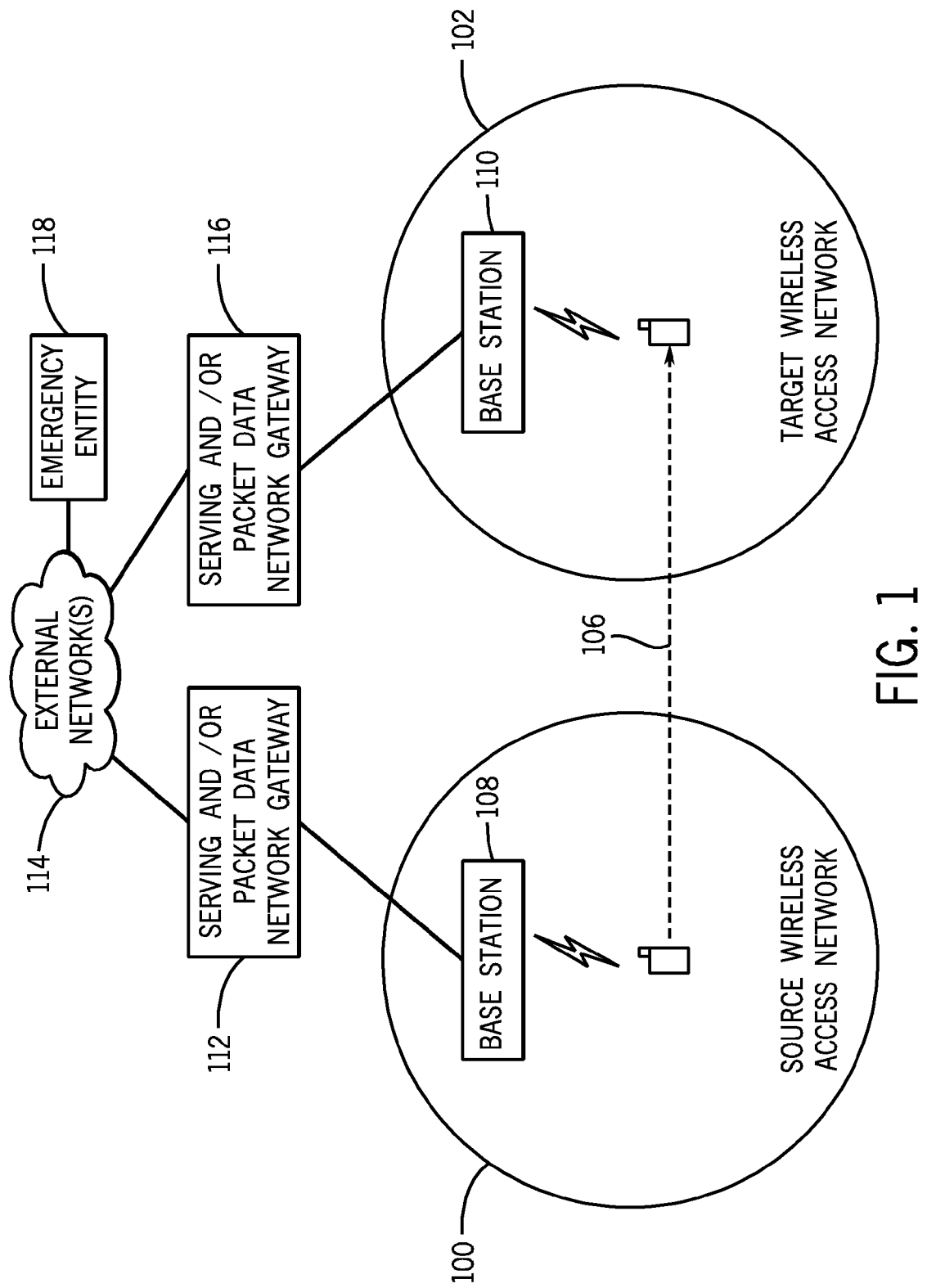
FIG. 1 is a block diagram of an example arrangement that includes different types of wireless access networks and a mechanism to transfer a packet-switched emergency call of a mobile station between the different types of wireless access networks, according to some embodiments.

Multi-mode mobile stations are able to communicate over various different types of wireless access networks. For example, a multi-mode mobile station can attach to either an LTE (Long-Term Evolution) wireless access network (as defined by 3GPP) or an HRPD (High Rate Packet Data) wireless access network (as defined by the 3GPP2 CDMA 2000 standard). LTE is also referred to as EUTRA (Evolved Universal Terrestrial Radio Access). Although reference is made to the EUTRA and HRPD wireless access technologies in this discussion, in some preferred embodiments, it is noted that other preferred embodiments can employ other types of wireless access technologies. For example, other types of wireless access technologies include WiMax (Worldwide Interoperability for Microwave Access) technology (as defined by the IEEE (Institute of Electrical and Electronic Engineers) 802.16 standard), GSM (Global System for Mobile Communications, as defined by 3GPP), and so forth.

As the multi-mode mobile station reaches a boundary between different types of wireless access networks, a decision can be made to hand off (or hand over) the mobile station from a first type wireless access network to a second type wireless access network such as from an EUTRA wireless access network to an HRPD wireless access network. In the ensuing discussion, it is noted that the terms "hand off" and "hand over" are used interchangeably.

The multi-mode mobile station may be involved in a packet-switched emergency call during handoff between different types of wireless access networks. An "emergency call" can refer to a emergency voice call, a non-voice emergency call, or any other request for or notification of emergency assistance, such as a request in response to activation of a panic button; a notification sent to emergency personnel in response to user request (such as merely dialing 911), where the notification includes sufficient information (e.g., name, location, etc.) for emergency personnel to render aid without interaction from the user; and other emergency notifications. A "packet-switched" emergency call refers to an emergency call established over packet-switched networks (wired and/or wireless). A mobile station is "involved" in a packet-switched emergency call if the mobile station is either (1) actively in the emergency call, or (2) the mobile station is trying to establish the emergency call or otherwise requesting that the emergency call be made. A packet-switched emergency call refers to a call session made over a packet-switched network to an emergency services entity (such as an enhanced 911 or E911 call). An emergency call is typically directed to an emergency contact number (such as 911 in the United States).

It is desired that when a mobile station is involved in a packet-switched emergency call, the handoff between different types of wireless access networks should be performed as quickly as possible so that the caller does not waste valuable time in trying to reach emergency personnel. Conventionally, a handoff of an emergency call may require that registration procedures be performed at the target wireless access network, which can be time consuming.

In accordance with some preferred embodiments, to reduce the amount of delay in handing off a mobile station between source and target wireless access networks of different types, pre-registration of the mobile station with the target wireless access network can be performed. Such pre-registration allows the mobile station to more quickly acquire a traffic channel at the target wireless access network without having to perform time-consuming registration during the handover. Alternatively, instead of performing pre-registration, a pre-defined emergency call session can be used instead, where the context (including registration) for the emergency call session is already known to both the mobile station and the target wireless access network, such that establishment of such context can be avoided during the handover for the packet-switched emergency call.

Generally, according to some preferred embodiments, the procedure for handing off a mobile station that is involved in an emergency call includes detecting that the mobile station is to be handed off from a source wireless access network to a target wireless access network, where the source and target wireless access networks are of different types (e.g., the source wireless access network is the EUTRA network and the target wireless access network is the HRPD access network). In response to detecting that the mobile station is to be handed off, a message is sent indicating handoff of the mobile station from the source wireless access network to the target wireless access network to cause the packet-switched emergency call to be performed over the target wireless access network.

More generally, the mobile station that is involved in a packet-switched emergency call can be transitioned between the source and target wireless access networks without a handoff being performed. For example, the mobile station may initially be attached to the source wireless access network. However, the mobile station can enter a region (e.g., a tunnel), where the link with the source wireless access network is lost. Once the mobile station exits the region, the mobile station may re-attach to the target wireless access network. In this scenario, no handoff is performed. However, in accordance with some embodiments, the emergency call is still transitioned from the source to target wireless access network. Thus, a mobile station "transitioning" from a source wireless access network to a target wireless access network can refer to the mobile station being handed off from the source wireless access network to the target wireless access network, or otherwise moving from the source wireless access network to the target wireless access network (without explicit handoff).

Although embodiments are discussed in the context of handing off a mobile station from a source wireless access network to a target wireless access network, it is noted that techniques as discussed can also be applied when the mobile station performs any other type of transitioning from the source wireless access network to the target wireless access network.

FIG. 1 illustrates an example arrangement that has a source wireless access network 100 (e.g., EUTRA network) and a target wireless access network 102 (e.g., HRPD access network), where the source and target wireless access networks are of different types. In the example of FIG. 1, it is assumed that a multi-mode mobile station 104 is to be handed off (as indicated by dash arrow 106) from the source wireless access network 100 to the target wireless access network 102.

As used here, reference to an EUTRA wireless access network refers to a wireless access network that conforms to the requirements of the EUTRA standard developed by 3GPP, as that standard currently exists or as the standard evolves over time. Note that EUTRA can refer to the current EUTRA standard, or to modifications of the EUTRA standard that are made over time. It is expected that in the future a standard that has evolved from EUTRA may be referred to by another name. Thus, it is contemplated that the term "EUTRA" as used here is intended to cover such future standards as well.

Similarly, reference to other standards, such as HRPD, is also intended to refer to the current wireless access standard or to a standard that is to be developed in the future.

In the source wireless access network 100, a base station 108 is provided to perform wireless communication with the mobile station 104. In the EUTRA context, the base station 108 is referred to as an enhanced node B ("eNode B"). The target access network 102 also includes a base station 110, which conforms to the HRPD standard, for example. The base station 108 or 110 is able to perform one or more of the following tasks: radio resource management, mobility management for managing mobility of mobile stations, routing of traffic, and so forth. More generally, the term "base station" can refer to a cellular network base station, an access point used in any type of wireless network, or any type of wireless transmitter to communicate with mobile stations. The term "base station" can also encompass an associated controller, such as a base station controller or a radio network controller. It is also contemplated that the term "base station" also refers to a femto base station or access point, a micro base station or access point, or a pico base station or access point. A "mobile station" can refer to a telephone handset, a portable computer, a personal digital assistant (PDA), or an embedded device such as a health monitor, attack alarm, and so forth.

In the EUTRA context, the base station 108 in the source wireless access network 100 is connected to a serving and/or packet data network or gateway 112, which terminates the user plane interface towards the enhanced node B and assumes the responsibility for packet routing and transfer towards an external network 114. The base station 110 of the target access network 102 is similarly connected to a serving and/or packet data network or gateway 116, which in the HRPD context is referred to as a packet data serving node (PDSN).

The external network 114 can include a packet-switched network (e.g., the Internet) and/or a circuit-switched network, such as the PSTN (public switched telephone network). An emergency entity 118 is connected to the external network 114, where the emergency entity 118 can be a 911 call center, a police department, a fire department, and so forth.

Figure 2:
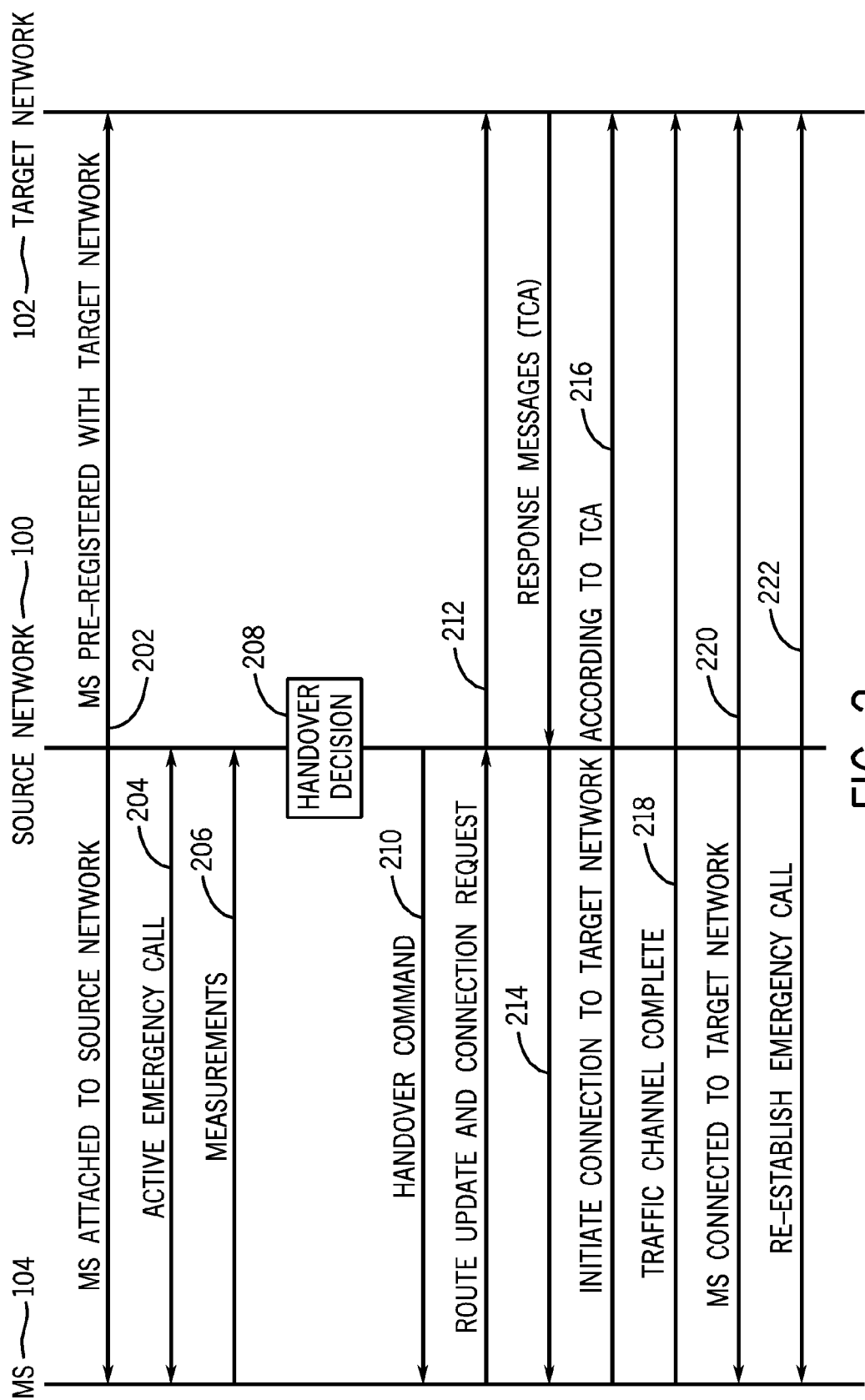
FIGS. 2-5 are message flow diagrams of processes of performing handoff of a mobile station involved in a packet-switched emergency call session, according to some embodiments.

FIG. 2 is a message flow diagram of a process according to an embodiment of the invention. It is assumed that the mobile station is initially attached (at 202) with the source wireless access network 100 (in other words, the mobile station is in a connected state with the source wireless access network 100. In accordance with some embodiments, the mobile station 104 is also pre-registered (at 202) with the target wireless access network 102. In this scenario, the mobile station 104 is able to perform pre-registration with the target wireless access network 102 while the mobile station is camped on the source wireless access network 100k. Pre-registration refers to session set up, performing binding, and any other procedure(s) that is required for the mobile station 104 to establish an active traffic session with the target access network. However, the mobile station 104 while attached to the source wireless access network is not communicating traffic with the target wireless access network even though the mobile station 104 is pre-registered with the target wireless access network.

Pre-registration allows the mobile station 104 and target wireless access network 102 to have sufficient information (stored in the mobile station 104 and target wireless access network 102) about a session such that a traffic channel can be quickly assigned to the mobile station 104 to direct switching of the emergency call to the target wireless access network 104.

FIG. 2 also shows that the mobile station is currently active in a packet-switched emergency call (at 204) over the source wireless access network 100. This means that the mobile station 104 is currently in a voice call with the emergency entity 118.

While the packet-switched emergency call is progressing, the mobile station makes measurements regarding wireless channel conditions with respect to wireless links between the mobile station 104 and each of the source and target wireless access networks 100 and 102. For example, the measurements can be of pilot channels transmitted by base stations. As the mobile station approaches a boundary between the source and target wireless access networks, signaling with the source wireless access network 100 may become weaker while signaling with the target wireless access network 102 may become stronger. The mobile station sends (at 206) the measurements to the source wireless access network 100.

Based on the received measurements, the source wireless access network 100 can make a handover decision (at 208) to initiate handoff of the mobile station 104 to the target wireless access network 102. Once the source wireless access network 100 makes the decision to perform the handoff, the source wireless access network 100 sends a handover command (at 210) to the mobile station 104.

In response to the handover command from the source wireless access network 100, the mobile station 104 sends (at 212) one or more messages indicating that the handoff is to be performed. As a result of the pre-registration performed by the mobile station 104 with respect to the target wireless access network 102, the mobile station 104 has sufficient information to connect to the target wireless access network 102 when handoff to the target wireless access network occurs.

The one or more messages sent by the mobile station 104 can be in the format of the standard corresponding to the target wireless access network 102 (e.g., HRPD standard). For example, the one or more messages can include an HRPD Route Update message, which indicates the potential handoff target. Another message that can be sent by the mobile station 104 for performing the handoff is an HRPD Connection Request for establishing a connection with the target wireless access network 102. As shown in the example of FIG. 2, the Route Update and Connection Request messages are sent through the source wireless access network 100 to the target wireless access network 102. For example, these messages could be encapsulated within another message according to the standard corresponding to the source wireless access network 100 (e.g., EUTRA standard).

To ensure that the handoff is performed as quickly as possible, an emergency indication can be provided in the one or more messages sent (at 212) by the mobile station 104. For example, the emergency indication can be provided as an emergency indicator in the Connection Request message. Alternatively, the source wireless access network 100 can provide an emergency indication as part of interworking messages sent from the source wireless access network 100 to the target wireless access network 102 to perform handoff of the mobile station 104.

Alternatively, the emergency indication can be included in a header of a message according to a format of the source wireless access network 100 (e.g., EUTRA format). In this case, the source wireless access network 102 will add the emergency indication to a message forwarded from the source wireless access network 100 to the target wireless access network 102.

In response to receiving the one or more messages sent at 212, the source wireless access network 102 sends (at 214) various response messages to the mobile station 104 (through the source wireless access network 100). The messages sent can include a TCA (Traffic Channel Assignment) message according to HRPD for assigning one or more traffic channels to the mobile station 104. Other messages are also included in the responses sent from the target wireless access network 102 through the source wireless access network 100 to the mobile station 104.

The exchange of messages at 212 and 214 effectively involves tunneling of first format messages (e.g., HRPD messages) associated with the target wireless access network 100 over the link between the source wireless access network 100 and the mobile station 104. For example, the HRPD messages are tunneled (encapsulated) within EUTRA messages sent between the source wireless access network 100 and the mobile station 104.

In response to receipt of the response messages (sent at 214), the mobile station 104 initiates (at 216) connection to the target wireless access network 102 according to the received TCA message. The mobile station 104, after successfully connecting to the target wireless access network 102, sends (at 218) an HRPD Traffic Channel Complete message to acknowledge the TCA message received by the mobile station 104.

At this point, the mobile station is connected (at 220) with the target wireless access network 102. The emergency call is re-established (at 222) between the mobile station 104 and the target wireless access network 102, using the packet-based voice call profile (e.g., voice-over-Internet protocol (VoIP) profile) of the call that was performed through the source wireless access network 100.

Figure 3:
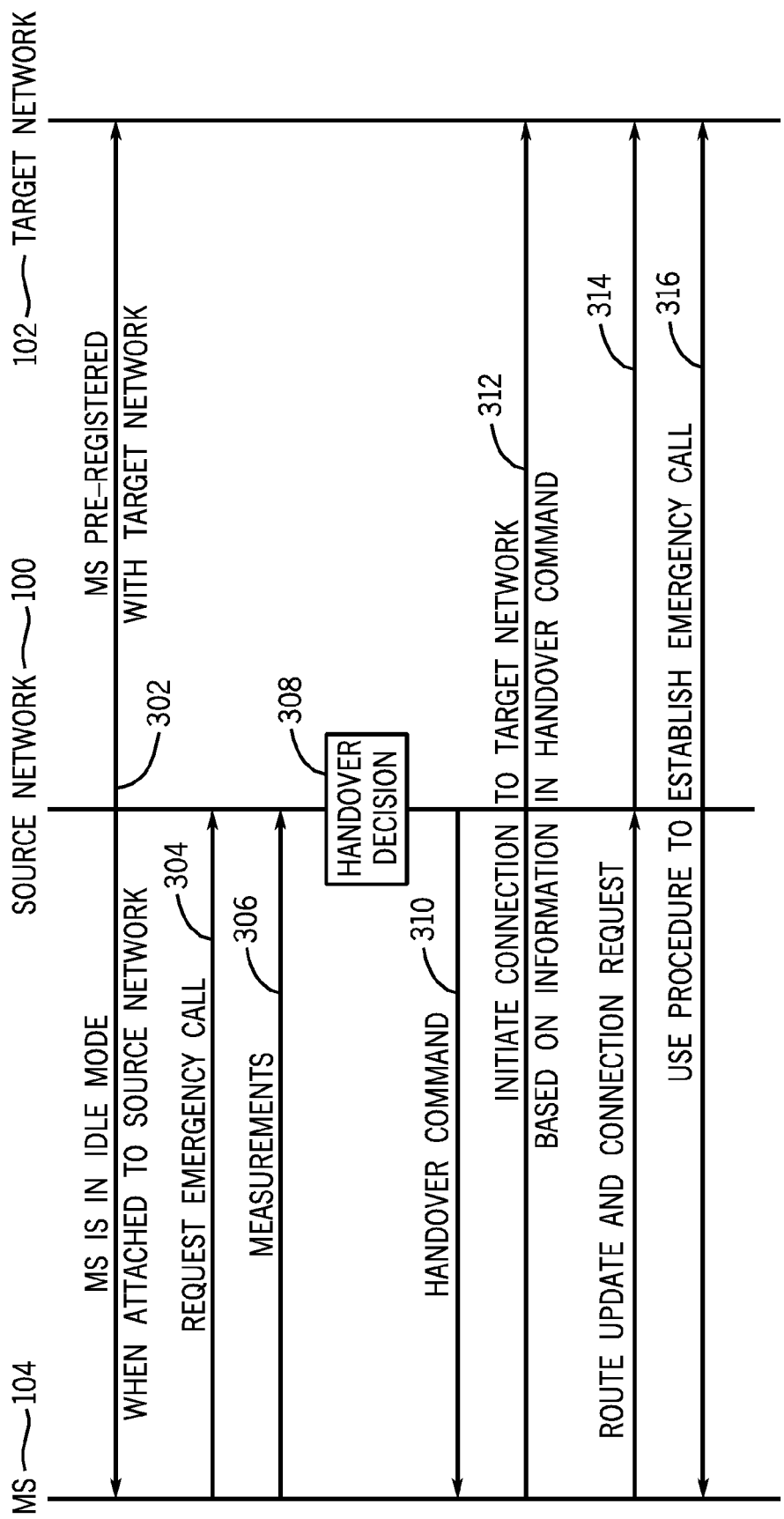

FIG. 2 assumes that the mobile station 104 is already actively in an emergency call while the mobile station 104 is attached to the source wireless access network 100. Alternatively, the mobile station 104 can be in an idle mode (not actively engaged in the emergency call) while the mobile station is initially attached to the source wireless access network 100. This scenario is depicted in FIG. 3, which shows the mobile station being in an idle mode while attached to the source wireless access network 100 (at 302). Moreover, as with the FIG. 2 example, the mobile station 104 has pre-registered (at 302) with the target wireless access network 102.

While in idle mode, the mobile station 104 requests (at 304) a packet-switched emergency call with the source wireless access network 100. The mobile station 104 also sends (at 306) signal measurements (e.g., pilot channel measurements) to the source wireless access network 100. Based on the received measurements, the source wireless access network 100 can make a decision (at 308) to handover the emergency call (that is being requested by the mobile station 104) to the target wireless access network 102. Based on this decision to handover the emergency call, the source wireless access network 100 sends (at 310) a message to the mobile station 104 to command the mobile station 104 to hand over to the target wireless access network 102. The handover message sent at 310 can include an emergency indicator to show its priority and to serve as an internal indicator between the EUTRA and HRPD protocol stacks.

Based on the handover command, the mobile station initiates (at 312) a connection to the target wireless access network 102 based on handover information contained in the handover command. Since the mobile station 104 knows that the handover to the target wireless access network 102 is for making an emergency call, the mobile station 104 sends (at 314) one or more messages with the emergency call indication. As discussed above, such messages sent from the mobile station 104 to the target wireless access network 102 for performing the handover can include a Route Update message and a Connection Request message, which can be tunneled through the source wireless access network 100 to the target wireless access network 102. A procedure (e.g., HRPD procedure) for establishing the emergency call is then employed (at 316) to make the emergency call through the target wireless access network 102.

FIGS. 2 and 3 assume that the mobile station 104 has performed pre-registration with the target wireless access network 102. However, in some cases, the pre-registration may not be enabled, or pre-registration is enabled but the mobile station 104 failed to complete the pre-registration. As a result, the mobile station 104 has not pre-established a specific session between the mobile station 104 and the target wireless access network 102 for an emergency call.

However, in accordance with this alternative embodiment, a predefined emergency call session is used, where information about the predefined emergency call session is stored in the mobile station 104 and the target wireless access network 104. The predefined emergency call session establishes the context for the emergency call after handoff, such that the emergency call can more quickly be re-established with the target wireless access network 102 after handoff. In yet another alternative embodiment, a predefined emergency call session is not required.

Figure 4:
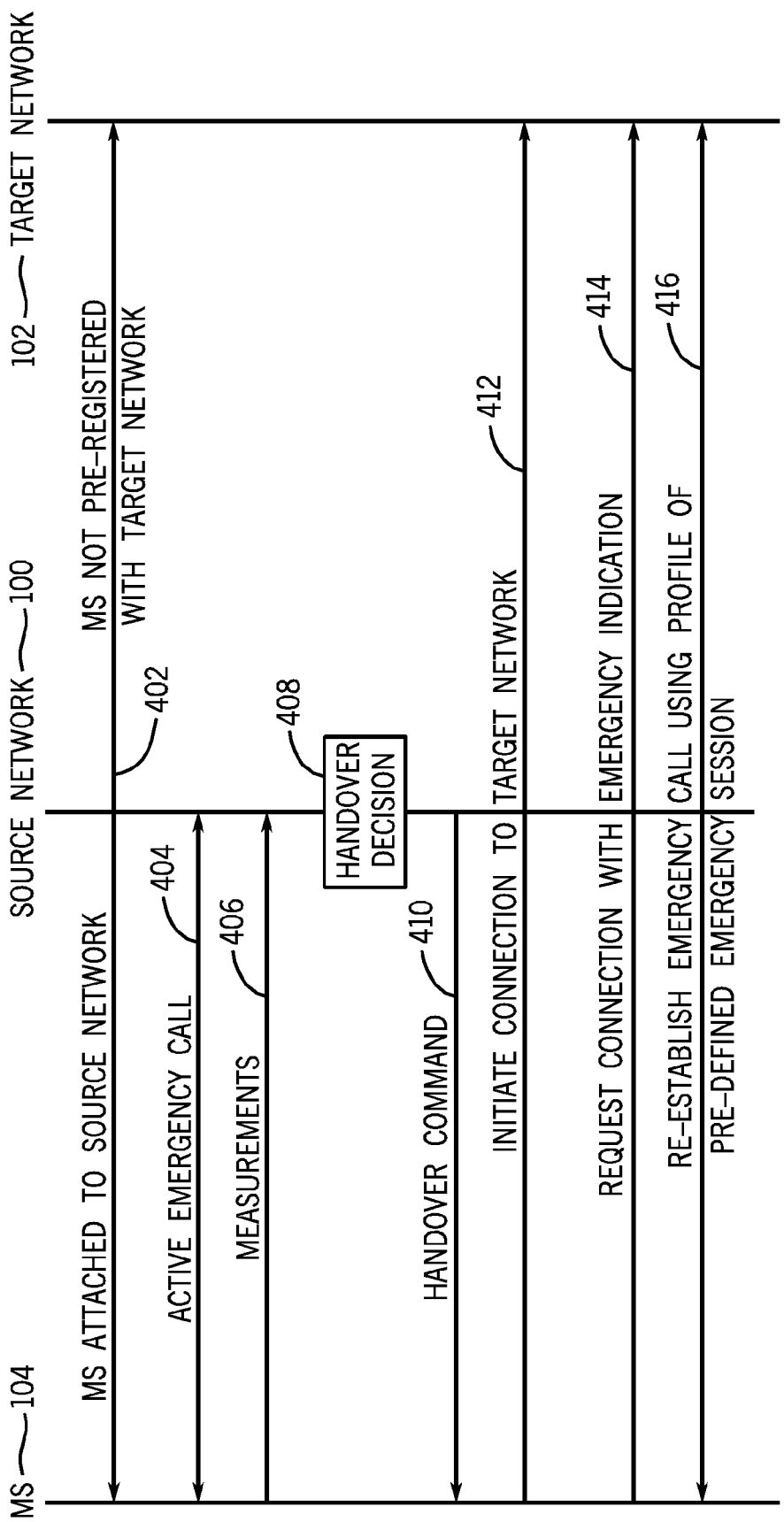

As depicted in FIG. 4, the mobile station 104 is initially attached (at 402) to the source wireless access network 100, but without a pre-registration with the target wireless access network 102. As with the example of FIG. 2, the mobile station 104 is in an active packet-switched emergency call (at 404) through the source wireless access network 100.

In the example of FIG. 4, the mobile station 104 sends (at 406) signal measurements (e.g., pilot measurements) to the source wireless access network 100, which can make a handover decision (at 408) based on the measurements. In response to making the handover decision, the source wireless access network 100 sends (at 410) a handover command to the mobile station 104.

In an alternative embodiment, the mobile station 104 is configured to perform handover to the target wireless access network autonomously; in other words, the mobile station 104 can perform the switch from the source wireless access network 100 to the target wireless access network 102 without first performing a handover procedure with the source wireless access network 100. The autonomous handover performed by the mobile station 104 can be based on signal measurements (of signals with base stations in the respective source and target wireless access networks 100 and 102). However, even though the mobile station 104 is able to autonomously perform handover, the mobile station 104 may still send some type of an indication to the source wireless access network 100 indicating that the mobile station 104 is switching to a different system.

As further depicted in FIG. 4, the mobile station 104 initiates (at 412) a connection to the target wireless access network 102, based on the handover information from the source wireless access network 100 (in the handover command received at 410) or based on autonomous handover of the mobile station 104.

The mobile station 104 then requests (at 414) a connection with the target wireless access network 102, including an emergency indication in the one or more request messages sent at 414. Next, the packet-switched emergency call is re-established with the target wireless access network 102 with the emergency profile of the predefined emergency session. This emergency profile is known to both the access network 102 and the mobile station 104. The predefined emergency call session allows for quicker establishment of an emergency call over the target wireless access network 102 after the handover, since the emergency context has already been established so that context negotiation (including registration) between the mobile station 104 and the target wireless access network 102 does not have to be performed.

Figure 5:
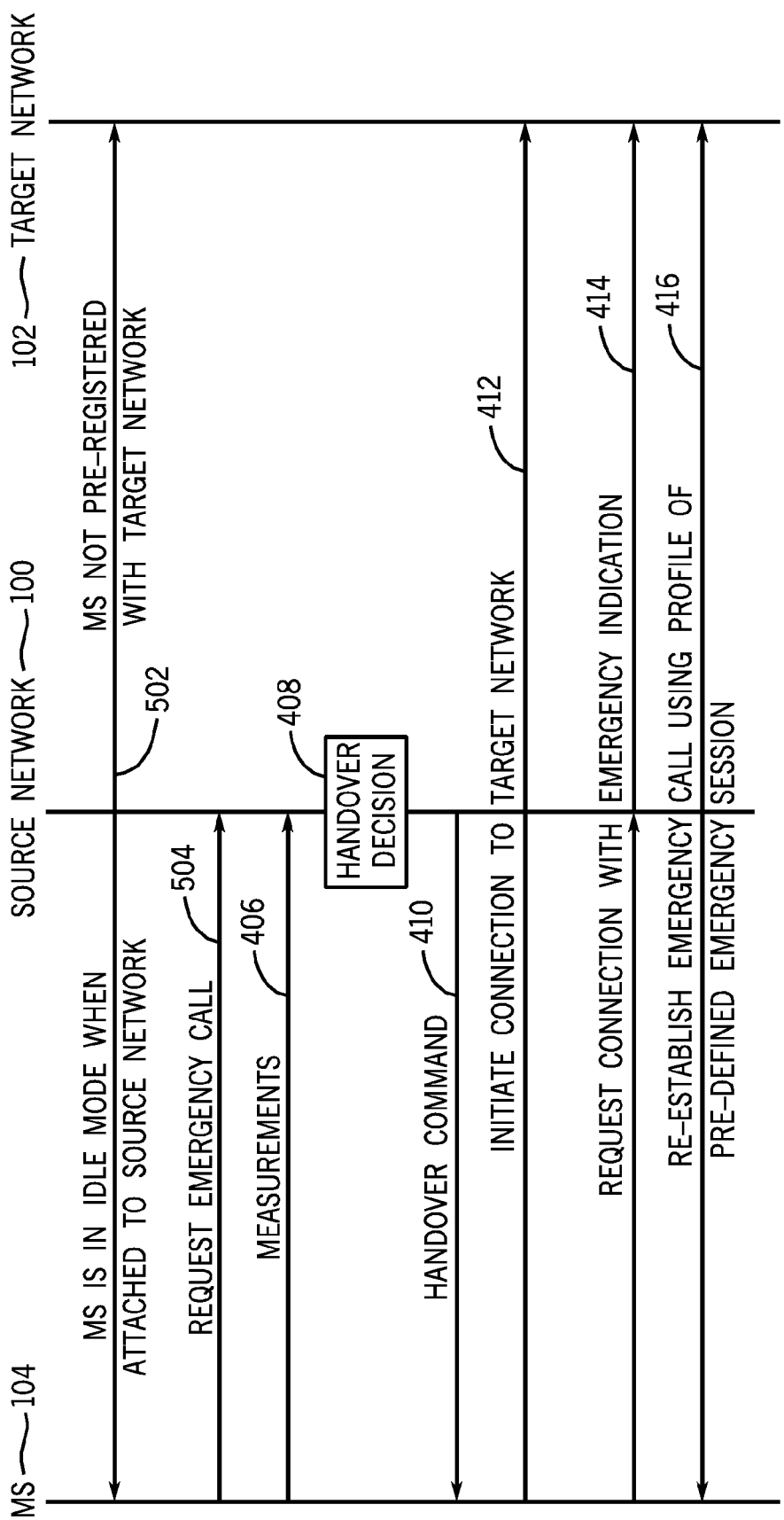

In an alternative scenario, as depicted in FIG. 5, instead of actively being in an emergency call as depicted in FIG. 4, the mobile station 104 can be in idle mode (similar to the scenario of FIG. 3) when attached to the source wireless access network 102, and the mobile station is not pre-registered with the target wireless access network 102 (502 in FIG. 5). In this case, the FIG. 4 procedure is modified by adding another message from the idle mode mobile station 104 to the source wireless access network 100 for requesting (at 504) to make a packet-switched emergency call (similar to message 304 in FIG. 3). The remaining procedure of this modified flow is similar to the procedure of FIG. 4.

Figure 6:
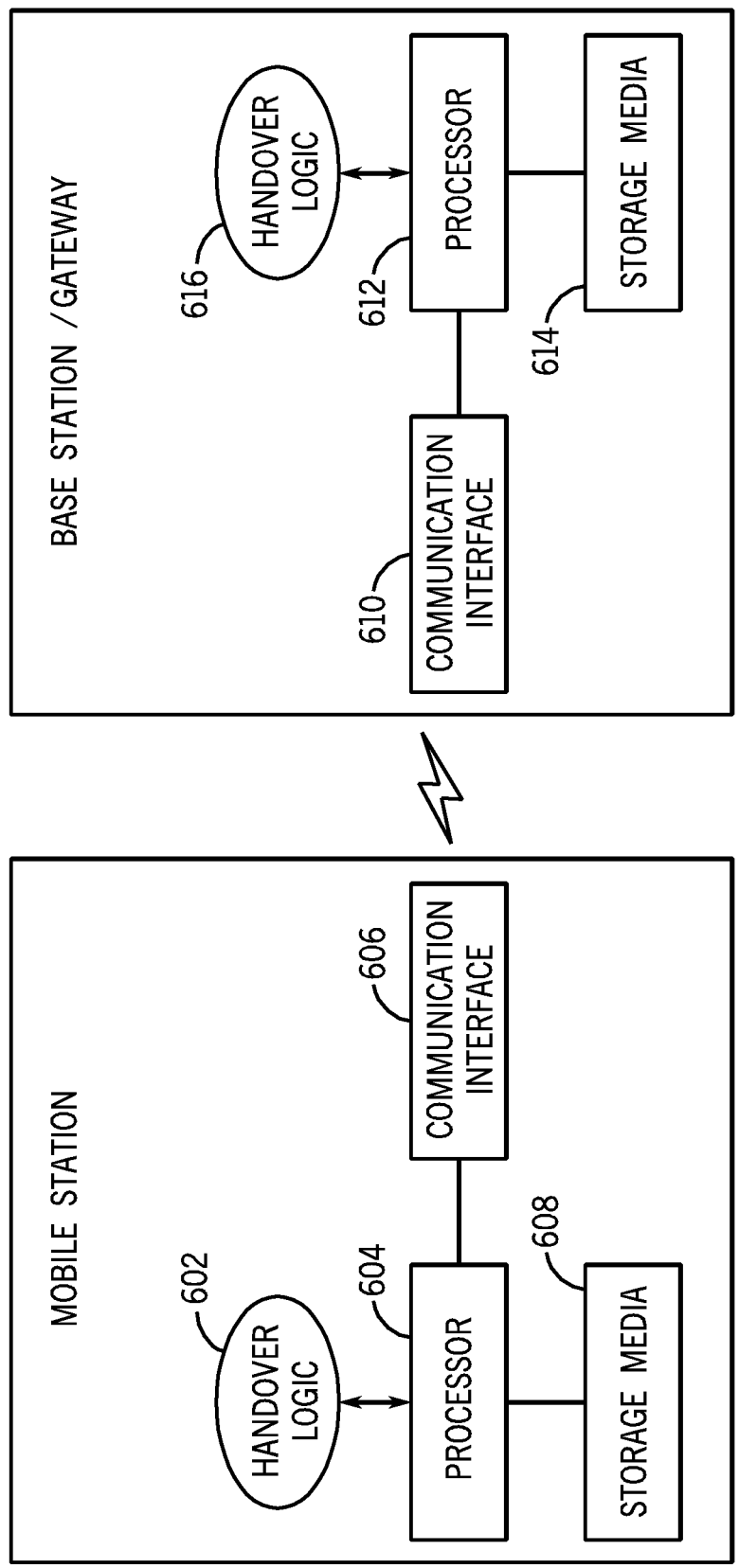
FIG. 6 is a block diagram of example components of a mobile station and a base station/gateway, according to some embodiments.

FIG. 6 is a block diagram depicting example components of the mobile station (104 in FIG. 1) and a base station and/or gateway, which can include any of the entities 108, 110, 112, and 116 in FIG. 1. Each of the mobile station and base station and/or gateway is considered a communications node. The mobile station includes handover logic 602, which can be software executable on one or more processors 604. The one or more processors 604 are connected to a communications interface 606 and storage media 608. The communications interface 606 allows the mobile station 104 to communicate over an air interface with the base station.

The base station/gateway includes a communications interface 610, which is connected to one or more processors 612 that are in turn connected to storage media 614. The base station/gateway also includes handover logic 616 executable on the one or more processors 612.

Instructions of software described above (handover logic 602 and 616) are loaded for execution on the one or more processors 604 or 612. Each processor can include a microprocessor, a microcontroller, a processor module or subsystem (including one or more microprocessors or microcontrollers), or another control or computing device.

Data and instructions (of the software) are stored in respective storage devices, which are implemented as one or more tangible computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom.

It is intended that the appended claims cover such modifications and variations as fall within the true spirit and scope of the invention.

What is claimed is:

1. A method comprising:
pre-registering, by one or more processors, a mobile station with a second type wireless access network when the mobile station is initially attached to a first type wireless access network;
storing information relating to a predefined emergency call session to be used with the second type wireless access network;
detecting, by one or more processors, that the mobile station is involved in a packet-switched emergency call while the mobile station is attached to the first type of wireless access network;
detecting, by the one or more processors, transitioning of the mobile station from the first type wireless access network to the second type wireless access network; and
in response to detecting transitioning of the mobile station, the one or more processors sending a message indicating transitioning of the mobile station from the first type wireless access network to the second type wireless access network to cause the packet-switched emergency call to be performed over the second type wireless access network using the information of the predefined emergency call session to avoid negotiating a context of a packet-switched emergency call with the second type wireless access network after the transitioning, the first type wireless access network being an Evolved Universal Terrestrial Radio Access (EUTRA) network and the second type wireless access network being a High Rate Packet Data (HRPD) access network.

2. The method of claim 1, wherein the one or more processors that perform the detecting tasks and the sending task are in the mobile station.

3. The method of claim 1, wherein the one or more processors that perform the detecting tasks and the sending task are part of a base station in the first type wireless access network.

4. The method of claim 1, wherein pre-registering the mobile station includes establishing a session between the mobile station and the second type wireless access network.

5. The method of claim 1, wherein after the transitioning from the first type wireless access network to the second type wireless access network, the mobile station does not have to perform a registration procedure with the second type wireless access network to perform the packet-switched emergency call since the mobile station is already pre-registered with the second type wireless access network.

6. The method of claim 1, further comprising:
as part of the transitioning, including in one or more messages sent to the second type wireless access network an emergency indication.

7. The method of claim 6, wherein the emergency indication is added by the first type wireless network to a message forwarded to the second type wireless network.

8. The method of claim 1, wherein the sending a message comprises messaging according to a standard of the second type wireless access network tunneled through a link between the mobile station and the first type wireless access network.

9. The method of claim 1, wherein the deciding is based on measurements of wireless channel conditions made by the mobile station.

10. The method of claim 9, wherein the mobile station sends the measurements of the wireless channel conditions to the first type wireless access network.

11. A communications node comprising:
one or more processors;
a communication interface; and
a storage media, coupled to the one or more processors, comprising instructions executable by the one or more processors to configure the communication node to:
pre-register a mobile station with a target wireless access network when the mobile station is initially attached to a source wireless access network;
store information regarding a predefined emergency call session to be used with the target wireless access network;
responsive to the source wireless access network deciding to transition the mobile station, communicate messaging via the communication interface to allow transitioning of the mobile station from the source wireless access network to the target wireless access network; and
use the stored information regarding the predefined emergency call session to establish the packet-switched emergency call over the target wireless access network without negotiating a context of the packet-switched emergency call with the target wireless access network, the source wireless access network being an Evolved Universal Terrestrial Radio Access (EUTRA) network and the target wireless access network being a High Rate Packet Data (HRPD) access network.

12. The communications node of claim 11, comprising the mobile station.

13. The communications node of claim 11, comprising a node in the target wireless access network.

14. The communications node of claim 11, wherein the stored information is related to a predefined emergency call session.

15. The communications node of claim 11, wherein the messaging comprises messaging according to a standard of the target wireless access network tunneled through a link between the mobile station and the source wireless access network.

16. The communication node of claim 11, wherein pre-registration of the mobile station includes establishing a session between the mobile station and the target wireless access network.

17. The communication node of claim 11, wherein after the transition from the source wireless access network to the target wireless access network, the mobile station does not have to perform a registration procedure with the target wireless access network to perform the packet-switched emergency call since the mobile station is already pre-registered with the target wireless access network.

18. The communication node of claim 11, wherein the one or more processors is further configured to:
as part of the transition, include an emergency indication in one or more messages sent to the target wireless access network.

19. One or more computer-readable storage memories storing instructions-executable by one or more processors to:
pre-register a session with a second type wireless access network while a mobile station is attached to a first type wireless access network;
store information relating to a predefined emergency call session to be used with the second type wireless access network;
detect that the mobile station is involved in a packet-switched emergency call while the mobile station is attached to the first type of wireless access network;

detect transitioning of the mobile station from the first type wireless access network to the second type wireless access network; and in response to detecting transitioning of the mobile station, send a message indicating transitioning of the mobile station from the first type wireless access network to the second type wireless access network to cause the packet-switched emergency call to be performed over the second type wireless access network using the stored information relating to the predefined emergency call session to avoid negotiating a context of the packet-switched emergency call with the second type wireless access network, the first type wireless access network being an Evolved Universal Terrestrial Radio Access (EUTRA) network and the second type wireless access network being a High Rate Packet Data (HRPD) access network.

20. The one or more computer-readable storage memories of claim 19, wherein the detection of the transitioning and the sending of the message are performed by the mobile station.

21. The one or more computer-readable storage memories of claim 19, wherein the detection of the transitioning and the sending of the message are performed by a base station in the first type wireless access network.

22. The one or more computer-readable storage memories of claim 19, wherein pre-registering the mobile station includes establishing a session between the mobile station and the second type wireless access network.

23. The one or more computer-readable storage memories of claim 19, wherein after the transitioning from the first type wireless access network to the second type wireless access network, the mobile station does not have to perform a registration procedure with the second type wireless access network to perform the packet-switched emergency call since the mobile station is already pre-registered with the second type wireless access network.

24. The one or more computer-readable storage memories of claim 19, the instructions are further executable to:

as part of the transitioning, include in one or more messages sent to the second type wireless access network an emergency indication.

25. The one or more computer-readable storage memories of claim 19, wherein the message comprises messaging according to a standard of the second type wireless access network tunneled through a link between the mobile station and the first type wireless access network.

\* \* \* \* \*